(12) United States Patent
Wang et al.

(10) Patent No.: US 11,160,077 B2
(45) Date of Patent: Oct. 26, 2021

(54) NARROW-BAND BROADCAST/MULTI-CAST DESIGN

(71) Applicant: QUALCOMM Incorporated, San Diego, CA (US)

(72) Inventors: Renqiu Wang, San Diego, CA (US); Hao Xu, Beijing (CN); Peter Gaal, San Diego, CA (US); Alberto Rico Alvarino, San Diego, CA (US); Xiao Feng Wang, San Diego, CA (US); Seyed Ali Akbar Fakoorian, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 16/688,928

(22) Filed: Nov. 19, 2019

(65) Prior Publication Data

US 2020/0100249 A1 Mar. 26, 2020

Related U.S. Application Data

(62) Division of application No. 15/348,789, filed on Nov. 10, 2016, now Pat. No. 10,531,456.

(Continued)

(51) Int. Cl.
*H04W 72/04* (2009.01)
*H04W 4/06* (2009.01)
(Continued)

(52) U.S. Cl.
CPC .......... *H04W 72/0453* (2013.01); *H04L 1/08* (2013.01); *H04L 27/2607* (2013.01);
(Continued)

(58) Field of Classification Search
CPC ......... H04W 72/0453; H04W 72/0446; H04W 72/005; H04W 4/70; H04L 1/08
See application file for complete search history.

(56) References Cited

U.S. PATENT DOCUMENTS 9,712,945 B2 7/2017 Oh et al.
9,973,303 B2 5/2018 Papasakellariou et al.
(Continued)

FOREIGN PATENT DOCUMENTS

CN 103227702 A 7/2013
CN 104737486 A 6/2015
WO 2015113501 A1 8/2015

OTHER PUBLICATIONS

International Search Report and Written Opinion—PCT/US2017/012542—ISA/EPO—dated Jun. 6, 2017.

(Continued)

*Primary Examiner* — Min Jung
(74) *Attorney, Agent, or Firm* — Procopio, Cory, Hargreaves, LLP; Nerrie M. Zohn

(57) ABSTRACT

NB wireless communication involves numerous challenges. A limited frequency dimension may need to be shared by multiple users. At times, large data transmissions, including multiple TBs of data may be transmitted using NB communication, and it may be important that each TB be successfully received by the users. The apparatus may transmit data comprising a plurality of TBs in a narrow band communications system, including repeating a transmission of the plurality of TBs, using any of a number of repetition patterns. The apparatus may use error correction encoding across multiple TBs. The transmission may be a single cell transmission or a multi-cell transmission.

26 Claims, 15 Drawing Sheets

Related U.S. Application Data

(60) Provisional application No. 62/305,985, filed on Mar. 9, 2016.

(51) Int. Cl.
  *H04L 29/08* (2006.01)
  *H04L 1/08* (2006.01)
  *H04W 4/70* (2018.01)
  *H04L 27/26* (2006.01)
  *H04W 72/00* (2009.01)
  *H04W 72/14* (2009.01)
  *H04L 1/00* (2006.01)

(52) U.S. Cl.
  CPC .............. *H04L 67/12* (2013.01); *H04W 4/06* (2013.01); *H04W 4/70* (2018.02); *H04W 72/005* (2013.01); *H04W 72/0446* (2013.01); *H04W 72/14* (2013.01); *H04L 2001/0093* (2013.01)

(56) References Cited

U.S. PATENT DOCUMENTS

| | | | |
|---|---|---|---|
| 2007/0177569 A1 | 8/2007 | Lundby et al. | |
| 2012/0263092 A1 | 10/2012 | Lee et al. | |
| 2014/0321418 A1* | 10/2014 | Rinne | H04L 1/08 370/329 |
| 2015/0009954 A1 | 1/2015 | Chang et al. | |
| 2015/0103946 A1 | 4/2015 | Choi et al. | |
| 2015/0263877 A1 | 9/2015 | Chang et al. | |
| 2015/0304063 A1* | 10/2015 | Zhu | H04W 92/18 370/329 |
| 2015/0381209 A1* | 12/2015 | Roh | H03M 13/618 714/755 |
| 2016/0081122 A1 | 3/2016 | Tang et al. | |
| 2016/0205529 A1* | 7/2016 | Oren | H04W 8/005 370/336 |
| 2016/0205671 A1 | 7/2016 | Tabet et al. | |
| 2016/0226649 A1 | 8/2016 | Papasakellariou et al. | |
| 2016/0295345 A1 | 10/2016 | Oh | |
| 2016/0309468 A1 | 10/2016 | Chen et al. | |
| 2016/0337157 A1 | 11/2016 | Papasakellariou | |
| 2016/0338010 A1 | 11/2016 | Rico et al. | |
| 2017/0006578 A1 | 1/2017 | Rico et al. | |
| 2017/0055246 A1 | 2/2017 | Tabet et al. | |
| 2017/0064620 A1 | 3/2017 | Wang et al. | |
| 2017/0202008 A1 | 7/2017 | Nader et al. | |
| 2017/0265168 A1 | 9/2017 | Wang et al. | |
| 2017/0265193 A1 | 9/2017 | Wang et al. | |
| 2017/0279472 A1 | 9/2017 | Wong et al. | |
| 2018/0070333 A1 | 3/2018 | Ponsard et al. | |
| 2018/0076915 A1 | 3/2018 | Carrick et al. | |
| 2018/0077662 A1 | 3/2018 | Kim et al. | |
| 2018/0097690 A1* | 4/2018 | Yocam | H04W 4/70 |
| 2018/0206271 A1* | 7/2018 | Chatterjee | H04L 5/0053 |

OTHER PUBLICATIONS

Nokia Networks: "MTC UE Behavior for Simultaneous Reception of Multiple Transport Blocks," 3GPP TSG-RAN WG1 Meeting #83, R1-156635, Anaheim, USA, Nov. 15-22, 2015, XP51003034A, 9 pages.
Partial International Search Report—PCT/US2017/012542—ISA/EPO—dated Apr. 10, 2017.

* cited by examiner

NARROW-BAND BROADCAST/MULTI-CAST DESIGN

CROSS-REFERENCE TO RELATED APPLICATION

This application is a divisional of U.S. application Ser. No. 15/348,789, entitled "Narrow-Band Broadcast/Multi-Cast Design" and filed on Nov. 10, 2016, which claims the benefit of U.S. Provisional Application Ser. No. 62/305,985, entitled "Narrow-Band Broadcast/Multi-Cast Design" and filed on Mar. 9, 2016, which is expressly incorporated by reference herein in its entirety.

BACKGROUND

Field

The present disclosure relates generally to communication systems, and more particularly, to narrow band wireless communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology.

However, as the demand for mobile broadband access continues to increase, there exists a need for further improvements in LTE technology. These improvements may also be applicable to other multi-access technologies and the telecommunication standards that employ these technologies.

In Narrow Band (NB) wireless communication, such as narrow band internet-of-things (NB-IOT) or enhanced Machine-Type Communications (eMTC), wireless communications may involve limited bandwidth. For example, in NB-IOT, wireless communication may be limited to a single Resource Block (RB). In eMTC, communication may be limited to six RBs. Such limited resources lead to unique challenges in transmitting data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

NB wireless communication, such as NB-IOT communication may involve numerous challenges due to the limited communication resources. For example, a limited frequency dimension may need to be shared by multiple users. For example, NB-IOT may comprise only a single RB, and eMTC may similarly use limited RBs. Transmitting large sets of data can be challenging using the limited, NB resources. Large transmissions, such as software updates, may involve multiple Transport Blocks (TBs) that must each be successfully received and decoded by multiple User Equipments (UEs). Such Narrow Band communication may involve large coverage areas, and therefore, UEs may experience different levels of coverage depending on their distance from the eNB. An eNB must balance the need to use the available bandwidth efficiently and to ensure that the data set is transmitted so that the UEs can receive and decode each of the TBs of the data set.

Aspects presented herein enable the eNB to transmit the data set in a way that enables UEs with different levels of coverage to accurately and efficiently receive the data set. In one example, the eNB may transmit the data using patterns of repetition of the TBs within the data. The eNB may use any of a number of different patterns of repetition for TBs of a data set, and/or may use a combination of repetition patterns for transmitting the TBs. The repetition patterns may be selected or designed in order to minimize delays for UEs of different levels of coverage in receiving the entire data set. In another example, the eNB may use error coding across multiple TBs or may repeat a transmission of the entire data set. The eNB may use a single cell transmission or a multi-cell multi-cast/broadcast. In another example, the eNB may signal configuration information indicating a transmission structure that will be used to transmit the TBs. In another example, the eNB may use feedback information received from a UE, such as an indication that the UE is ready to receive data or an indication that all the data was successfully received, in order to prepare for transmitting/retransmitting the data.

In an aspect of the disclosure, a method, a computer-readable medium, and an apparatus are provided. The apparatus transmits data comprising a plurality of TBs in a NB communications system, including repeating a transmission of the plurality of TBs.

Repeating the transmission of the TBs may include transmitting all of the plurality of TBs a first time, and then transmitting all of the plurality of TBs at least a second time. Repeating the transmission of the TBs may include transmitting a first TB from the plurality of TBs and transmitting a repeat of the first TB prior to transmitting a second TB from the plurality of TBs. Repeating the transmission of the TBs may include transmitting the data using a combination of a first pattern and a second pattern. When multiple RBs are available for the transmission of the data, the apparatus may transmit a first TB of the data and at least one repeat of the first TB of the data on a first RB and transmit a second TB of the data and at least one repeat of the second TB of the data on a second RB, the first RB and the second RB occupying different subbands.

The apparatus may encode the TBs of the data using error coding across multiple TBs of the data.

The apparatus may signal configuration information indicating the transmission structure and a time, frequency resource used for the plurality TBs.

The apparatus may receive feedback from a UE, such as an indication that the UE is ready to receive or that the UE acknowledges that all of the plurality of TBs were successfully received.

In another aspect of the disclosure, a method, a computer-readable medium, and an apparatus are provided. The apparatus transmits an indication to an eNB using an NB that a UE is ready to receive a data transmission from the eNB and receives a NB data transmission comprising a plurality of transport blocks from the eNB in response to the transmitted indication. The apparatus may also determine whether all of the plurality of TBs of the NB data transmission are successfully received by the UE and transmit an indication to the eNB that all of the TBs were successfully received by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
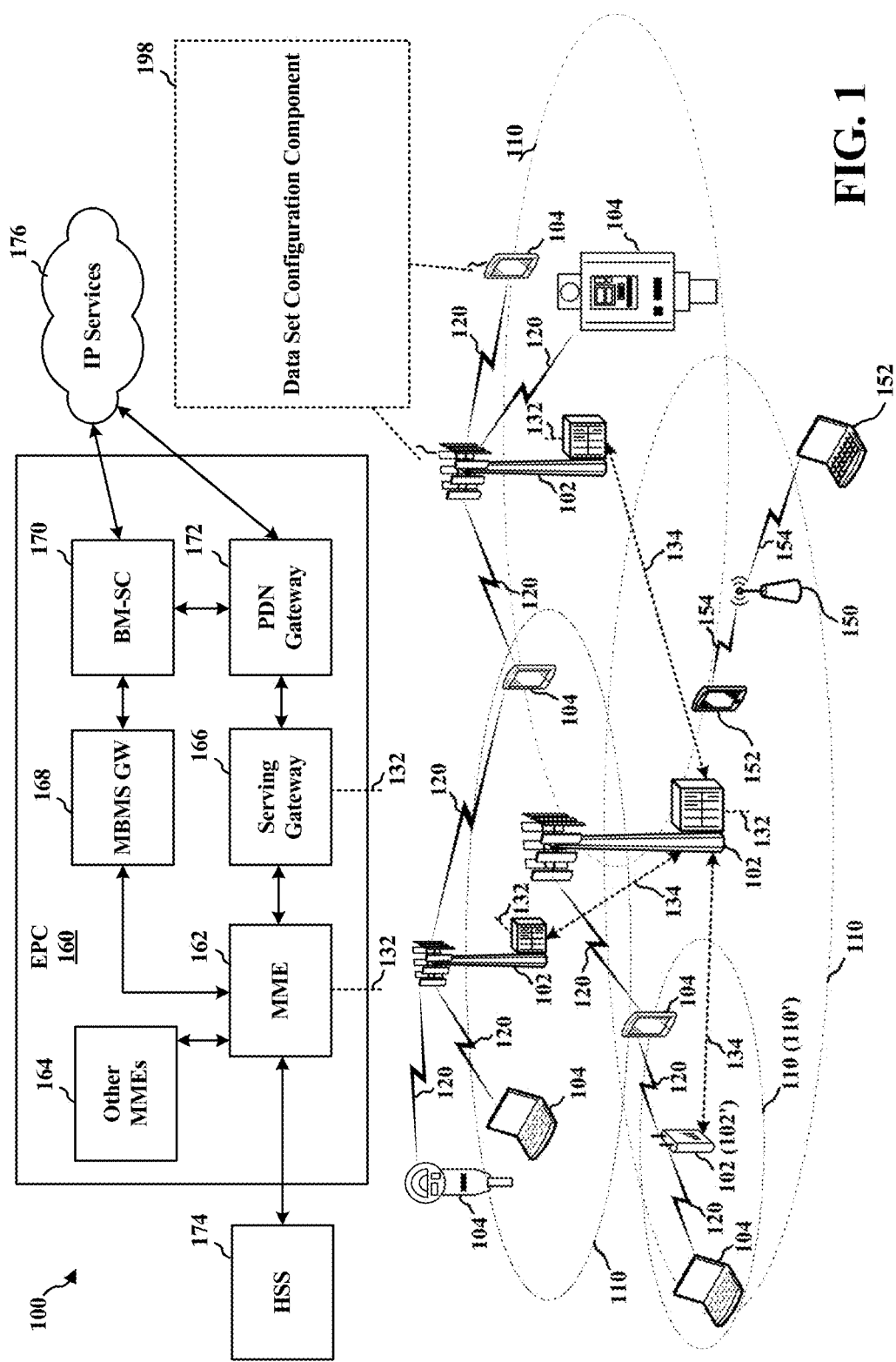
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to include a data set configuration component 198 that determines how to configure a transmission of a data set using NB communication such a NB-IOT or eMTC.

Figure 2:
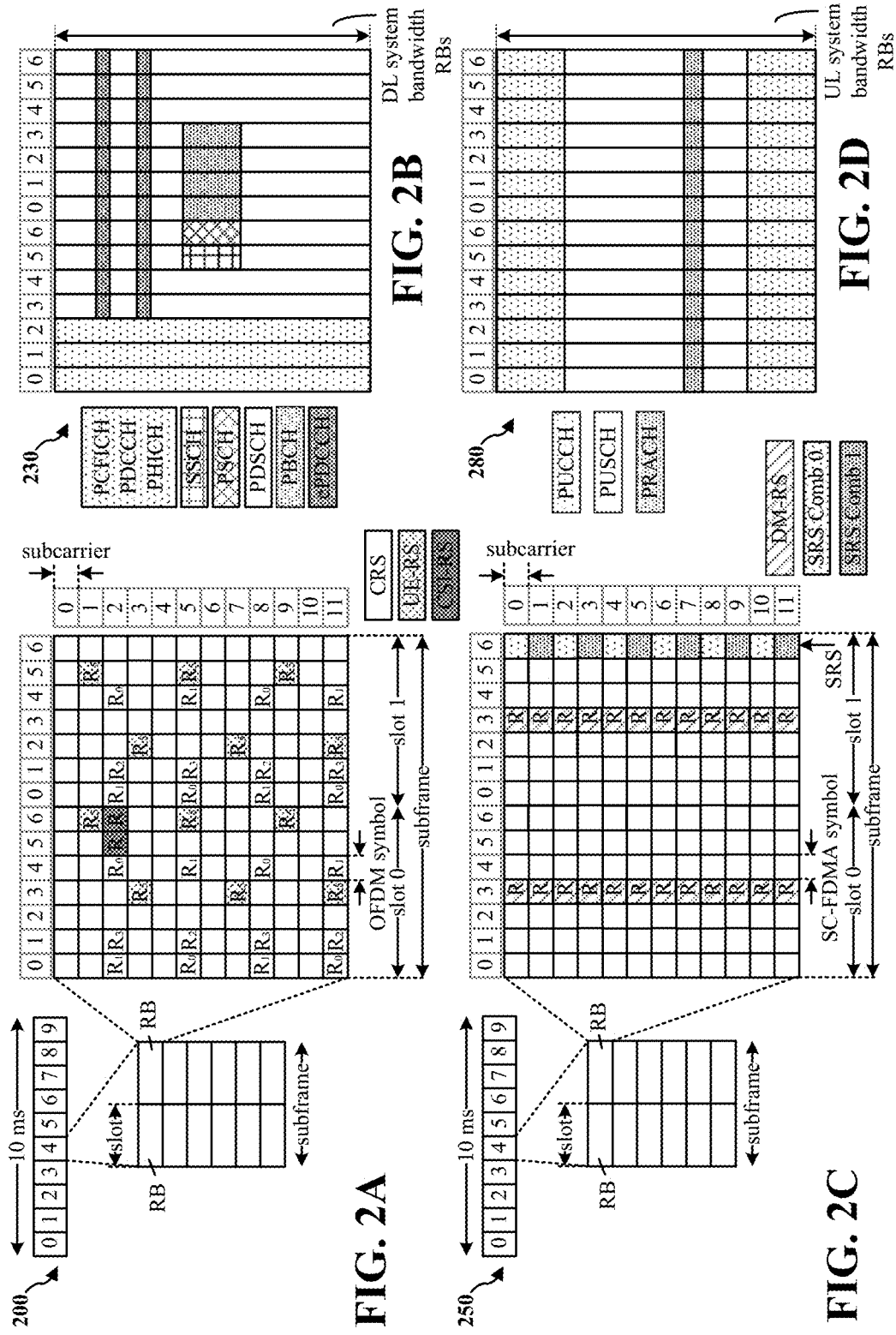
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
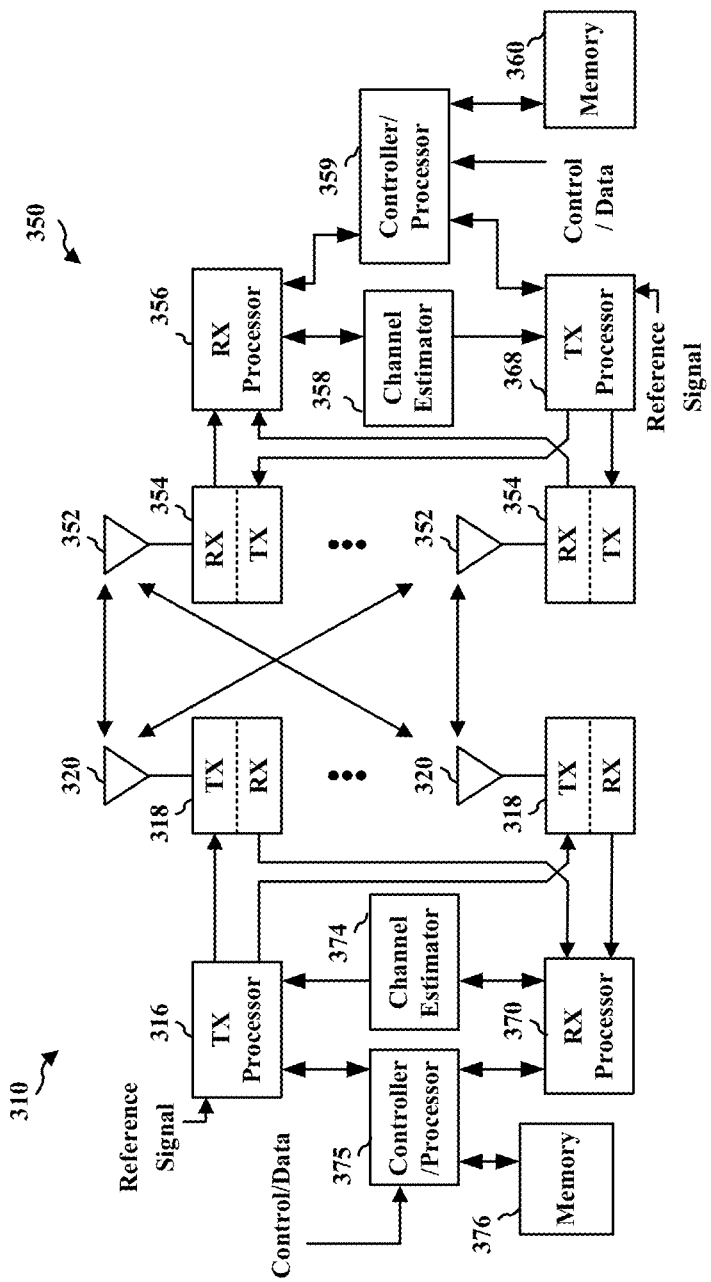
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

NB wireless communication involves unique challenges due to the limited frequency dimension of the narrow band. One example of such NB wireless communication is NB-IOT, which is limited to a single RB of system bandwidth, e.g., 200 Hz. Another example of NB wireless communication is eMTC, which is limited to six RBs of system bandwidth. This NB communication may be deployed "in-band," utilizing resource blocks within a normal LTE carrier, or in the unused resource blocks within a LTE carrier's guard-band. The NB communication may be deployed in a "standalone" system, e.g., in a dedicated spectrum. Multiple users may utilize the narrow band. While only some of the UEs may be active at a particular time, the NB communication should support such multi-user capacity.

Additionally, NB communication may need to provide for deep coverage, by accounting for devices in environments requiring different Coverage Enhancement (CE) levels. For example, some devices may need as much as 20 dB of CE, which results in greater uplink Transmission Time Interval (TTI) bundling, further limiting time resources.

NB-IOT communication may also involve a large cell radius, e.g., as much as approximately 35 km. Thus, the communication may involve a long delay, such as 200 μs, which may employ a long Cyclic Prefix (CP) length.

Similar challenges are involved with NB communication using eMTC.

At times, a large amount of data may need to be transmitted using NB wireless communication. Among other examples, software upgrades may include the transmission of a large set of data. The data transmission may be a unicast, one-to-one type transmission, or may be a multicast/broadcast, one-to-many type transmission using NB communication.

A multi-cast of a software upgrade, e.g., may involve transmitting a large set of data to a large number of UEs at the same time.

The large set of data may be segmented into a plurality of transport blocks (TBs). For example, the total data set may comprise M multiple TBs. A single TB may be transmitted over multiple subframes, e.g., S subframes, for one transmission. The number of subframes S comprised in the TB may be consistent for each of the TBs in the data set or may vary. For example, a final TB may have a different size than the other TBs of the data set. In LTE, one TB is typically finished within one subframe. However, in NB communication, due to the RB limitations, it may be difficult to convey a few hundred or close to one thousand information bits within one subframe. Therefore, one TB may be transmitted over multiple subframes with each subframe transmitting a portion of the data. This may be called cross-subframe coding. CRC overhead may be reduced by not dividing the TB into smaller TBs to be transmitted within one subframe.

A UE within the coverage area of an eNB may experience poor coverage. Among other reasons, this may be due to distance from the eNB or due to the signal being degraded due because the UE is located in a basement. Such UEs experiencing poor signal coverage might fail to receive some of the TBs. These UEs may need to rely on repetitions of the TBs in order to bundle or combine the TBs to decode the data transmission. For example, a UE with poor signal coverage may require N repetitions of the data transmission in order to successfully receive and decode each of the TBs.

For certain data transmissions, it may be important that all of the TBs of the data set be decoded successfully. For example, a software upgrade will not function correctly, unless all of the TBs of the software upgrade are successfully received and decoded.

Figure 4:
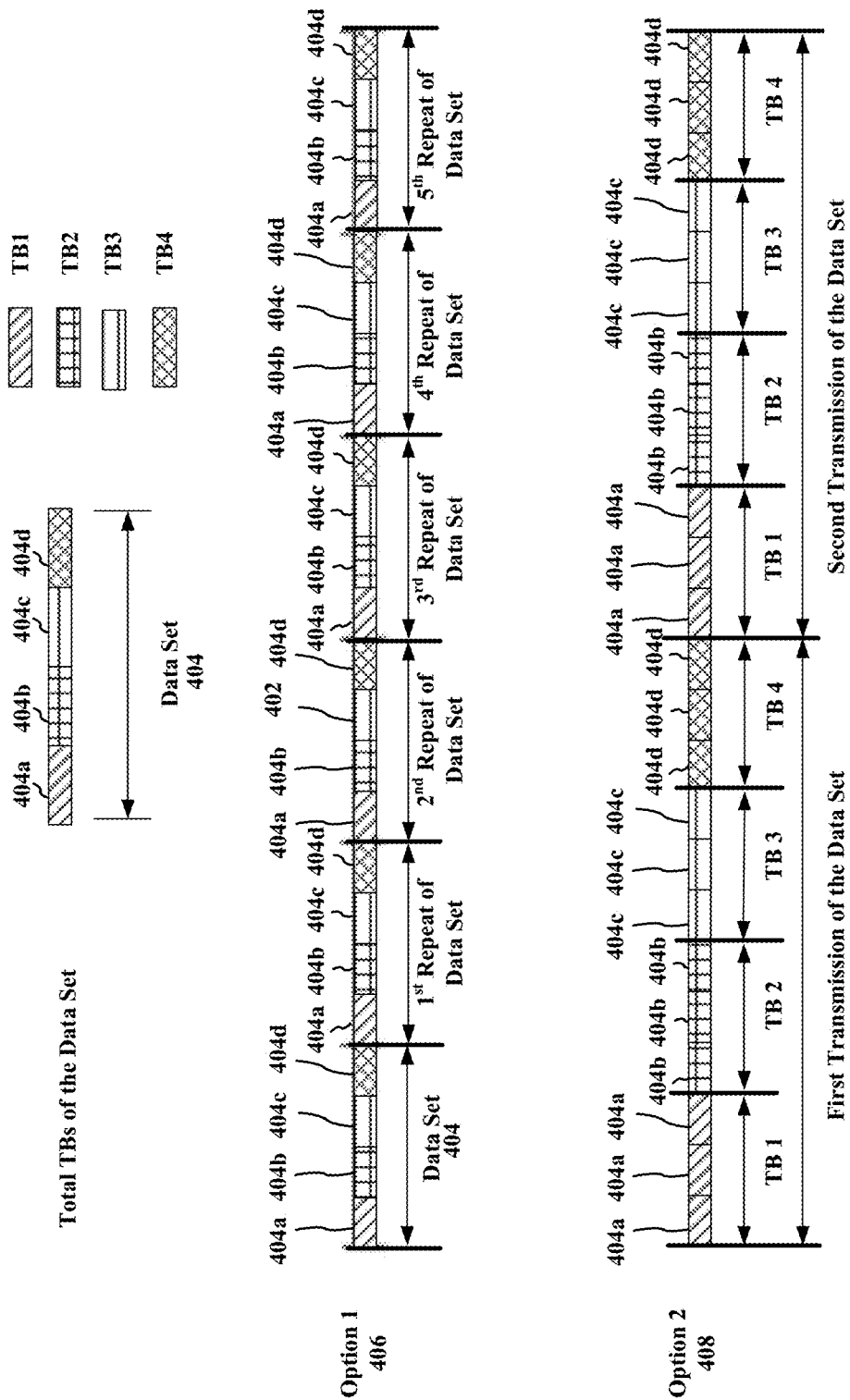
FIG. 4 illustrates a first option and a second option for patterns of transmitting TBs within a data set in accordance with aspects presented herein.

A pattern of transmission may be used for transmitting the data set that includes repeating a transmission of a TB within the data set. FIG. 4 illustrates a data set 402 having 4 TBs 404a, 404b, 404c, and 404d.

A first option 406 is illustrated having a first pattern of repetition for transmitting the TBs 404a, 404b, 404c, and 404d of the data set 402 in order. In this first option, each of the TBs of the data set are transmitted in order without intervening repetitions of individual TBs. Then, each of the TBs of the data set are repeated, e.g., at the $1^{st}$, $2^{nd}$, $3^{rd}$, $4^{th}$ and $5^{th}$ repeat of the data set. FIG. 4 illustrates that the TBs of the data set may be transmitted, e.g., five times. Five repetitions is only an example, and any number (R) of repetitions may be selected. In NB communication, receiving an ACK/NACK from a UE for individual TBs may require too much overhead in relation to the limited resources. Therefore, the number of repetitions may be selected based on an estimate of a probability of failed TBs. For example, the estimate may be based on a UE having poor signal coverage, e.g., for a UE having the worst coverage. In another example, the estimate may also be based on a UE having average signal coverage.

UEs having good coverage may be able to receive and decode all of the TBs of the data set without any repetition, or without as much repetition as other UEs. This first option is beneficial for UEs having good coverage, because they can actively receive the data transmission until they receive and decode each of the TBs. At that point, the UEs may discontinue decoding the TBs and may enter a sleep mode or other power saving mode. As the entire data set is transmitted prior to repeating a transmission of any of the individual TBs, the delay experienced by a UE with good coverage is based on M (the number of TBs in the data set)*S (the number of subframes in each TB).

UEs experiencing poorer coverage may not be able to successfully receive and decode a TB on its first transmission. For example, such UEs may require N transmissions in order to successfully receive and decode the data set. As the entire data set is transmitted prior to each repetition, these UEs with poor coverage will experience a delay of Delay=N*M*S, where N is the number of repetitions required by the UE in order to successfully receive and decode each of the TBs.

A second option 408 is also illustrated showing a second pattern of repetition for transmitting the four TBs of the data set 402. In this pattern, the TBs of the data set 404 are transmitted by repeating a transmission of each TB prior a number of times prior to transmitting the next TB. For example, in FIG. 1, each TB is transmitted a first time and repeated two additional times before the next TB is transmitted. Transmitting each TB three times is only one example of the repetition number R that may be employed. As described in connection with the first option 406, the number of repetitions used by the eNB R may be selected based on an estimate of a probability of failed TBs. In one example, the number of repetitions R may be selected so that R≤N.

The second option 608 also illustrates that after each of the TBs of the data set 402 have been transmitted using the pattern, e.g., in the first transmission of the data set, the pattern may be repeated so that each of the TBs are repeated again, e.g., as illustrated for the second transmission of the data set.

For a UE having good coverage, and therefore not requiring any repetitions or requiring fewer repetitions, this pattern causes an added amount of delay and requires the UE to be awake and actively receiving the TBs longer than in the first option. Even though the UE with good coverage does not require the repetitions, or not as many repetitions, the UE will have to remain awake and decode each of the repeated TBs, until it receives TB4. Such UEs will experience a delay based on M*R*S.

For UEs experiencing poor coverage, this second option will reduce the delay, because they may receive enough repetitions of each TB in order to successfully receive and decode the TB before the transmission moves to transmission of the next TB.

Figure 5:
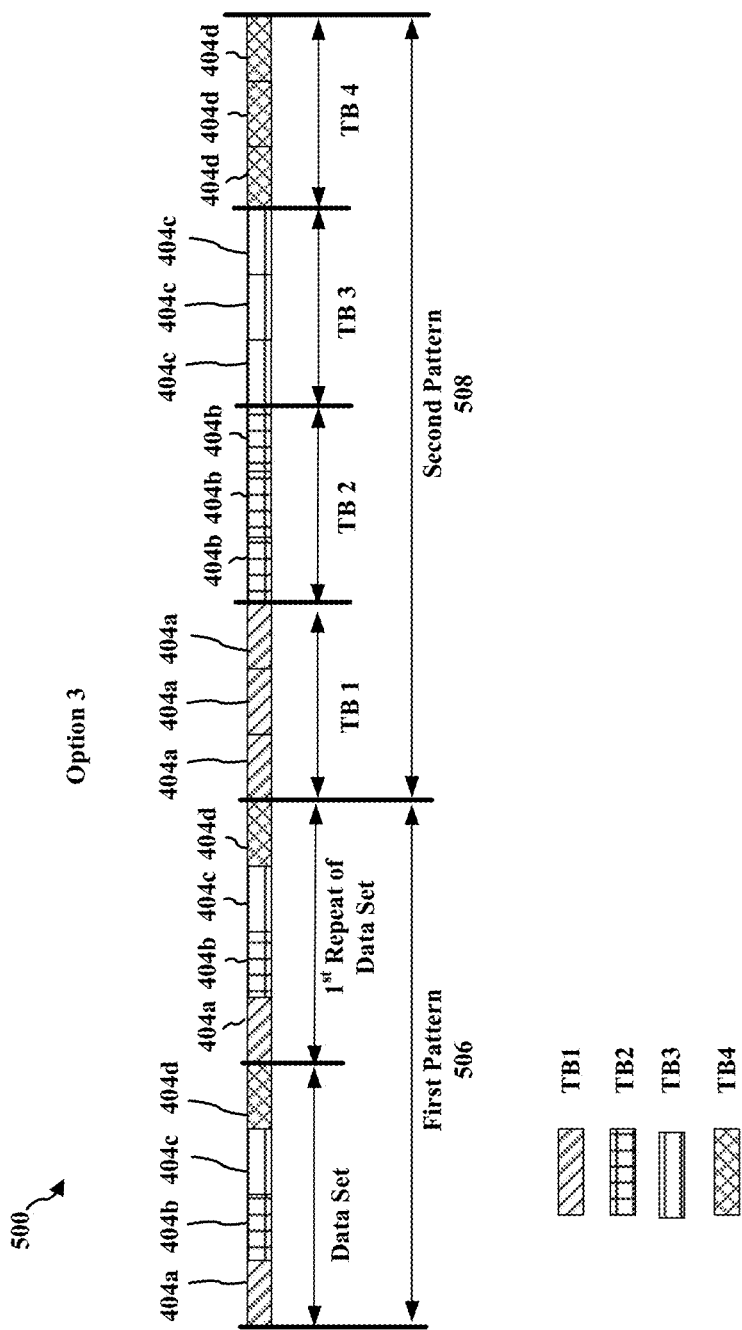
FIG. 5 illustrates a third option for patterns of transmitting TBs within a data set in accordance with aspects presented herein.

FIG. 5 illustrates a third option 500 that is a hybrid or combination of the patterns of repetition used in the first option 406 and the second option 408.

For example, FIG. 5 illustrates the data set being transmitted using a first pattern 506, similar to first option 406, and then the data set being transmitted using a second pattern 508, similar to the second option 408.

The combination of patterns of repetition may be designed to support users having different levels of coverage. In one example, a reduced number of repetitions of the entire data set may be employed as part of the first pattern 506 than would be used if the first pattern was used exclusively. For example, the first option 406 in FIG. 4 illustrates five repetitions of the entire data set. In contrast, in the combined patter of FIG. 5, the data set may be repeated only twice, or might not be repeated at all, using the first pattern before repeating the transmission of the data set repeated using the second pattern 508.

This combination pattern, e.g., a pattern formed by combining the first pattern 506 and the second pattern 508, may enable UEs experiencing good coverage to receive the entire data set using the first pattern and afterwards to enter a power saving mode. Then, UEs experiencing poor coverage are able to receive multiple repetitions of each TB in order to assist them to more efficiently receive and decode the data set. This reduces the delay that would be experienced by UEs with good coverage if the second option were to be used exclusively and helps to reduce the delay experienced by UEs with poor coverage if the first option were to be used exclusively.

Although FIG. 5 illustrates the use of a pattern associated with the first option being followed by a pattern associated with the second option, the patterns may be combined in the opposite order.

At times, more than one RB may be available for transmission by the eNB. Although a UE may only be able to receive a single RB at a time, the eNB may use these additional resources to more efficiently meet the needs of different UEs.

Figure 6:
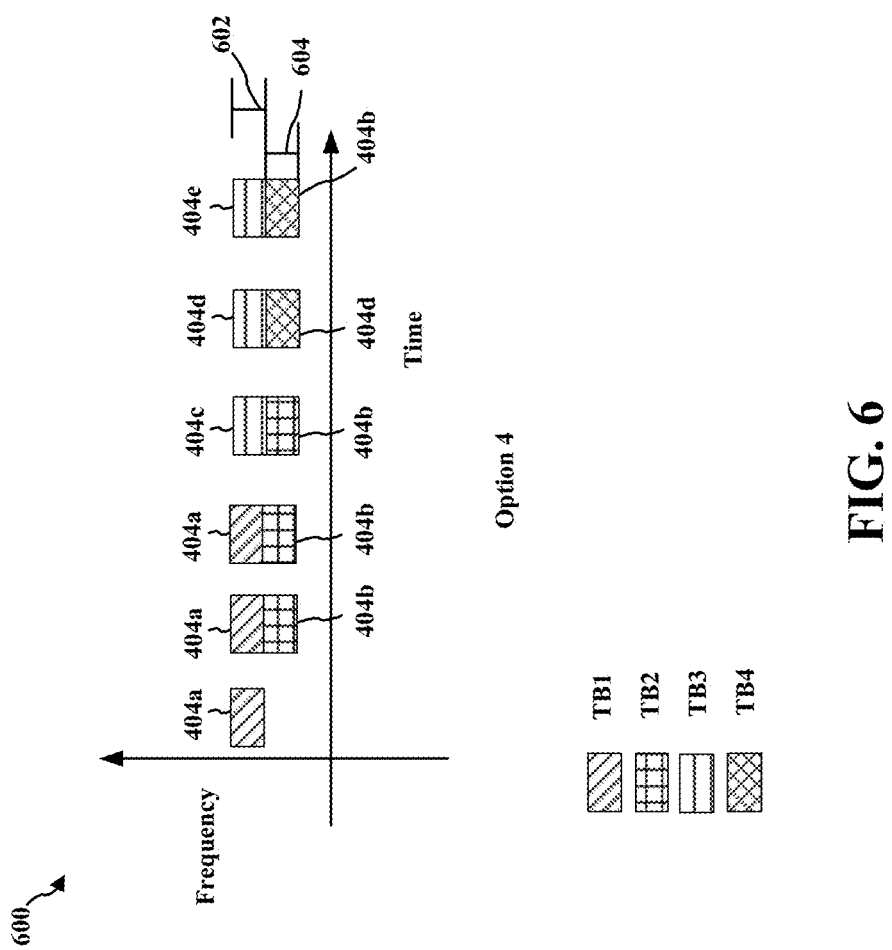
FIG. 6 illustrates a fourth option for patterns of transmitting TBs within a data set in accordance with aspects presented herein.

FIG. 6 illustrates a fourth option 600 using a first RB 602 and a second RB 604 to transmit the TBs 404a-d of the data set 402. The first RB 602 and the second RB 604 occupy different frequency subbands. The eNB may transmit different TBs at different RBs. The transmission of the different TBs using the different RBs may be overlapping in time, as illustrated in FIG. 6. For example, the eNB may transmit a first TB, e.g., 404a, multiple times on a first RB 602 and may transmit a second TB, e.g., 404b, repeatedly on a second RB 604. Thus, while a NB UE might only be able to receive a single RB at a time, the eNB may transmit different TBs of a data set overlapping in time.

FIG. 6 illustrates the TBs may be transmitted in a diagonally shifted manner using the available RBs. For example, initially, the first TB 404a may be transmitted on first RB 602 only and may then be repeated on the first RB 602. After the initial transmission of the first TB 404a, the second TB 404b may be transmitted and then repeated on the second RB 604. Thus, the first transmission of the second TB 404b may overlap the second transmission of the first TB 404a. Similarly, the third transmission of TB 404a may overlap the second transmission of TB 404b. Then, the third TB 404c may be transmitted for the first time on the first RB 602 and may overlap the third transmission of the second TB 404b on the second RB 604 and so forth until each of the TBs has been transmitted a number of times on at least one of the RBs. The cascading configuration of TBs may be limited by the total number of RBs supported by the UE and/or by the eNB. For example, multiple RBs may be available to the eNB for transmitting the TBs. However, a UE might be limited to receiving the TBs on only a portion of the available RBs at a time. Therefore, the configuration for transmitting the TBs using multiple RBs may be based the limitations of the eNB or the UE.

Aspects of the pattern illustrated FIG. 6 may be applied regardless of the relation of the number of TBs to the number of RBs by applying the pattern in order to transmit the plurality of TBs using the R repetitions before repeating the pattern again. For example, if three RBs are available, and 3 repetitions of each TB will be used, the following pattern in Table 1 may be used.

TABLE 1

| RB1 | 1 | 1 | 1 | 4 | 4 | 4 | 1 | 1 | 1 | 4 | 4 | 4 |
|-----|---|---|---|---|---|---|---|---|---|---|---|---|
| RB2 |   | 2 | 2 | 2 | 5 | 5 | 5 | 2 | 2 | 2 | 5 | 5 | 5 |
| RB3 |   |   | 3 | 3 | 3 | 6 | 6 | 6 | 3 | 3 | 3 | 6 | 6 |

Such a pattern can be applied whether there are fewer TBs than RBs available for the transmission. For example, in place of 3, 1 may be repeated, and in place of 4, 2 may be repeated. Similarly, if the number of TBs does not evenly divide between the number of available RBs, this pattern can also be used. For example, if there are 7 TBs in the data set, TB 7 can be transmitted in before returning to TB 1. In the pattern shown above, this would cause TB 1 to be transmitted using the second RB following the transmission of 5.

This fourth option 600, allows UEs with good coverage and with bad coverage to decode the data set in reduced time.

The pattern used by the eNB may be signaled to the UE in order to assist the UE in receiving and decoding the data set.

At times a UE might not receive or successfully decode each of the TBs of the data set due to signal fading.

Each TB may be individually protected by a Cyclic Redundancy Check (CRC) and encoded as a single codeword for transmission. Thus, even if a UE successfully receives TBs adjacent to a failed TB, the UE cannot use information from these successfully received TBs to help it decode the failed TB.

In order to help a UE successfully decode each of the TBs of the data set, an eNB may encode the TBs using error coding across multiple TBs of the data set, e.g., using outer coding across multiple TBs. This outer coding may be employed in combination with the individual CRC and may provide an added layer of error correction that can be used by the UE to decode a TB which it has failed to completely receive by using the error coding information in one of the other TBs in the data set that the UE has successfully received.

While this can reduce the number of repetitions required by a UE in order to successfully receive and decode all of the TBs of the data set, it requires additional complexity at the UE, e.g., additional decoding of the outer coding and additional storage. This outer coding would provide hard decoding rather than soft decoding. For example, outer coding similar to that employed in MBSFN may be used to outer code across multiple TBs when encoding the transmission for a multi-cast from the eNB.

The number of repetitions R used by the eNB may be adjusted based on whether error coding across multiple TBs is employed. For example, fewer repetitions may be needed by a UE, because the UE can use the error coding information from TBs that were successfully decoded in order to decode TBs that were not completely received.

As an alternative, the eNB may simply retransmit the entire data set for a number of retransmissions. For example, the eNB may transmit the TBs multiple times using a pattern of transmission, e.g., any of the four options described in connection with FIGS. 4, 5, and 6. Then, the eNB may retransmit the entire data set, again, using the pattern. For example, as illustrated in the second option 408 of FIG. 4, three repetitions of each of the TBs are transmitted. Then, the eNB retransmits the entire pattern. Thus, the eNB repeats a transmission of the entire Data set. FIG. 4 illustrates only a second transmission of the data set. However, any number of repetitions may be selected, e.g., based on an estimation of a probability of failed reception by a UE. The retransmission of the data set may be made using a different pattern than the first pattern, e.g., as illustrated in FIG. 5. The repeated transmission of the entire data set simplifies the requirements for the UE, as additional decoding and storage is not required. However, bandwidth efficiency is reduced because the eNB retransmits the entire data set, possibly with multiple transmissions of each TB in the data set. As there is no feedback or HARQ from the UE, the number of retransmissions of the data set may be based on an estimate of what is needed by an average UE, by a UE experiencing poor coverage, by a UE experiencing the worst coverage, etc.

In one example, the data set may be transmitted from a single cell, e.g., a single eNB. For example, the transmission of the data set may be a PDSCH based multi-cast. This single-cell transmission does not require coordination with other cells, and simplifies the requirements for the eNB.

In another example, the data set may be transmitted from multiple cells, e.g., a cluster of multiple eNBs. Multi-cell transmission may help UEs on the edge of coverage of a single cell to successfully receive and decode the data set. If a UE experiences poor coverage due to reasons other than being located near the edge of coverage for the cell, multi-cell transmission might not improve the ability of the UE to receive the data set. For a UE in deep coverage, such as in a basement, the UE may experience poor coverage, even though the UE is well within the coverage area of the eNB. The transmission may be within a particular subframe. For example, the multi-cast from multiple eNBs may use a Physical Multi-Cast Channel (PMCH). The data set may be transmitted within a NB Multimedia Broadcast Single Frequency Network (NB-MBSFN) region of the PMCH, e.g., within a NB-MBSFN region of NB-MBSFN subframes. In this example, the data set might be transmitted without using PDSCH. The multiple eNBs may be synchronized. In MBSFN for LTE, the transmission may employ, among others, QPSK, 16 QAM, 64 QAM, 256 QAM, etc. In contrast, in NB-IOT, QPSK may be used for the modulation. A semi-static resource allocation may be employed to transmit the data set. The data set might be transmitted without feedback or HARQ. The data set may be transmitted without MIMO. The resources for such a multi-cast may be preallocated. A bitmap may indicate the configuration or allocation of MBSFN resources.

Figure 7A:
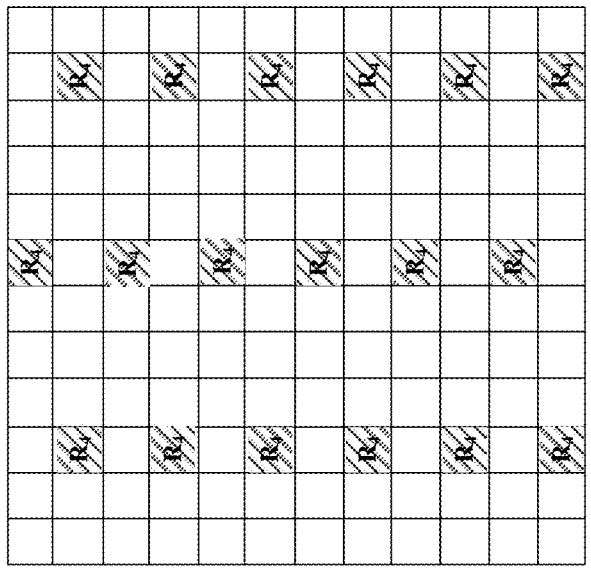
FIGS. 7A and 7B illustrate resource maps for Multicast Broadcast Single Frequency Network communication.

FIG. 7A illustrates an example of resource allocation for antenna port 4, which may be used in connection with an LTE MBSFN multi-cast. In FIG. 7A, I represents a symbol index. $R_4$ represents RS tones, e.g., for MBSFN transmission.

Figure 7B:
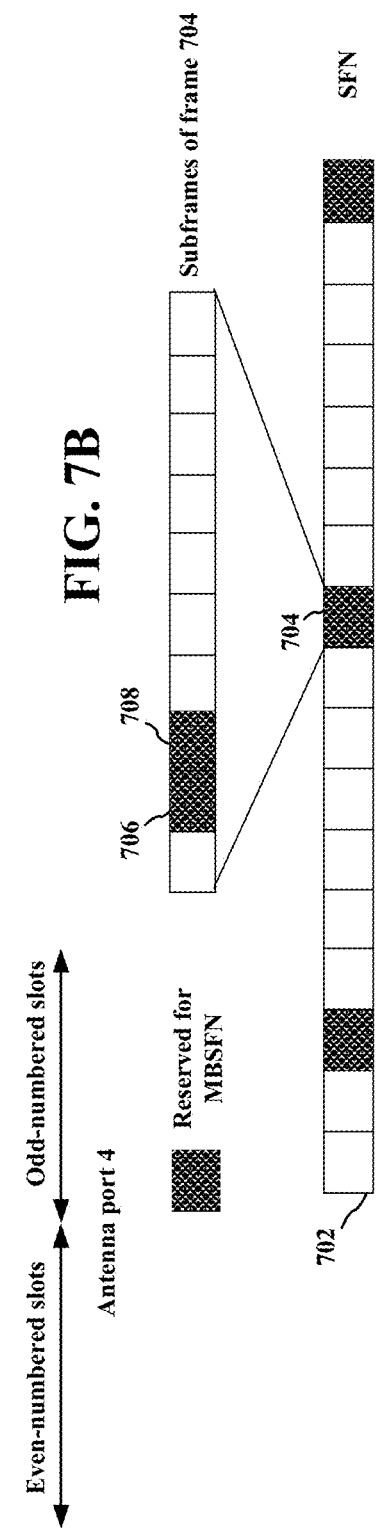

FIG. 7B illustrates an example allocation of subframes reserved for MBSFN in LTE. 702 illustrates a plurality of frames, e.g., each having a System Frame Number (SFN), e.g., which identifies the 10 ms radio frame of a cell of an eNB. The shaded frames are frames having subframes reserved for MBSFN. For example, frame 704 within group 702 has 10 subframes, two of which 706, 708 are reserved for MBSFN. On the unshaded frames, no MBSFN transmission can occur. Similarly, MBSFN can only occur within certain subframes of the frame. For example, in LTE, frames 0, 4, 5, and 9 cannot be used for MBSFN, only shaded subframes 706, 708 can be used for MBSFN. Similarly, in the subframes reserved for MBSFN, e.g., such as 706, 708, no PDSCH will be transmitted.

Although FIG. 7B illustrates a frame structure for LTE, NB-MBSFN communication may similarly be limited to certain subframes within certain frames of the NB resources.

The NB communication system may be standalone system or comprised within a wideband (WB) system using Extended Cyclic Prefix (ECP). Thus, at least a portion of the data set may be transmitted using ECP, e.g., as a 1RB NB-MBSGN transmission with ECP.

A Wideband (WB) system may also employ Normal Cyclic Prefix (NCP). In this type of communication system, a structure may be configured having special MBSFN subframes reserved just for NB UEs. This may include not scheduling a WB UE in these reserved subframes. The data set may be transmitted using ECP during these reserved subframes. Multiple TBs may be transmitted at different RBs, such as illustrated in FIG. 6. The use of different RBs might not be efficient if the number of TBs is much smaller than the system bandwidth, because the extra RBs will be wasted. If the number of TBs is larger than the system bandwidth, more than one TB may be transmitted to the same RB, by signaling patterns to the UE.

An eNB may signal information to the UE in order to assist the UE in receiving the transmission of the data set. The eNB may use a System Information Block (SIB) to send this information to the UE. The eNB may provide a time of the transmission to the UE, e.g., may indicate when the transmission will begin. The eNB may provide information regarding the configuration or structure of the transmission of the data set. This may include information regarding a repetition pattern for the transmission, including, among others, a TB size, a number of TBs in the data set, a repetition factor for each of the TBs in the data set, a repetition factor for the total data of the data set, a repetition type, and an indication of an intended UE coverage level for the corresponding pattern. For example, the repetition type may indicate one of the first option, second option, third option, and fourth option illustrated in connection with FIGS. 4-6. The eNB may signal resources that will be used for different patterns, e.g., if a hybrid pattern will be used, such as described in connection with FIG. 6. This allows the transmission of the data set to be targeted to UEs having good coverage or to UEs having poor coverage. For example, a data transmission targeted to UEs with good coverage may be time division multiplexed with a data transmission targeted to UEs with poor coverage.

As the eNB signals this information to the UE, the eNB may select between different patterns and types of data transmission.

A UE may also provide feedback to an eNB in order to help the eNB to improve bandwidth efficiency. For example, without an indication from the UE, an eNB does not know whether a UE is awake and ready to receive a transmission of the data set. This may cause the eNB to increase the number of repetitions of TBs within the data set and/or to increase a number of retransmissions of the entire data set in order to ensure that UEs that are not currently awake have the ability to successfully receive and decode all TBs of the data set.

The UE can help the eNB to increase bandwidth efficiency by providing an indication that it is ready to receive data. This enables the eNB to know that the UE is ready to receive the data set, and therefore more likely to successfully receive and decode the data set. After receiving the indication from the UE, the eNB may begin the transmission of the data set. This indication may allow the eNB to reduce a number of repetitions of the data set that the eNB transmits.

The UE may also provide feedback to the eNB regarding whether all of the TBs of the data set were successfully received and decoded. While feedback regarding individual TBs may require too much overhead for NB communication, the UE may provide this limited feedback regarding the entire data set as a whole. For example, the UE may transmit an ACK/NACK to the eNB after the transmission of the whole data set in order to let the eNB know whether the entire data set was successfully receive or not. The eNB may then respond by transmitting a repetition of the entire data set when a NACK is received from the UE or when an ACK is not received from the UE. When the eNB receives an ACK from the UE, the eNB can refrain from transmitting any additional repetitions of the data set.

Figure 8:
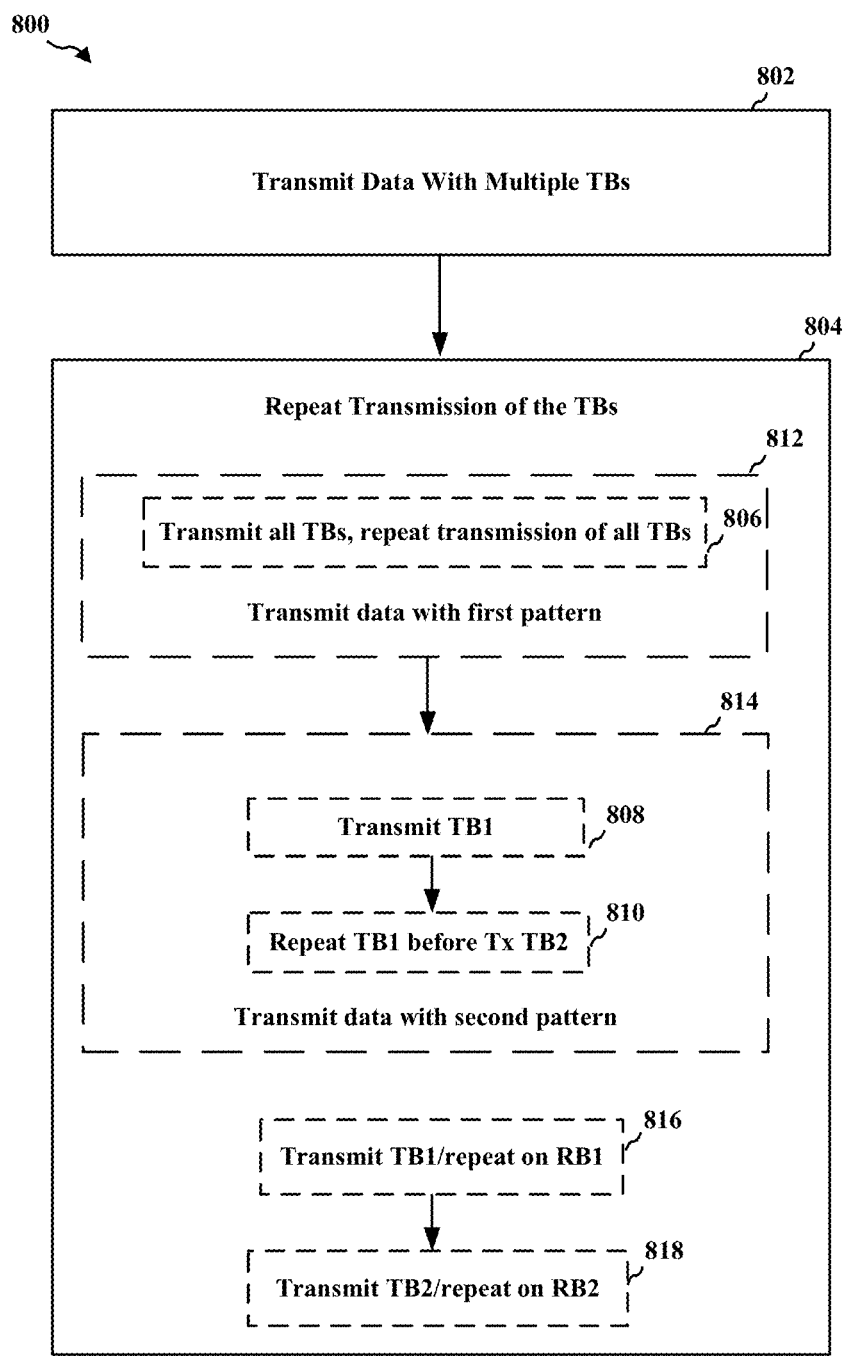
FIG. 8 is a flowchart of a method of wireless communication.

FIG. 8 is a flowchart 800 of a method of wireless communication. The method may be performed by an eNB (e.g., the eNB 102, 310, 1150, 1002/1002'). Optional aspects are illustrated using a dashed line. At 802, the eNB transmits data comprising a plurality of TBs in a NB communication system, e.g., 100 in FIG. 1. The NB communication system may comprise NB-IOT or eMTC, for example. The data may be transmitted as a broadcast or multicast transmission. The transmission of the data may also be a unicast. The data transmission may be a large data transmission, and may be one for which each of the TBs must be received and decoded by the UE in order to function properly, such as a software upgrade.

At 804, the eNB repeats a transmission of the plurality of TBs. This repeated transmission may involve at least one repetition pattern, e.g. as described in connection with any of FIGS. 4-6.

The repeated transmission of the TBs may be made using a repetition pattern similar to the first option described in connection with FIG. 4. For example, the repeating the transmission of the TBs at 804 may include the eNB transmitting all of the plurality of TBs in order a first time, and then transmitting all of the plurality of TBs in order at least a second time, e.g., at 806.

The repeated transmission of the TBs may be made using a repetition pattern similar to the second option described in connection with FIG. 4. Thus, at 808, the eNB may transmit a first TB from the plurality of TBs and at 810 may transmit a repeat of the first TB prior to transmitting a second TB from the plurality of TBs.

The repeated transmission of the TBs may be made using a hybrid repetition pattern similar to the third option described in connection with FIG. 5. Thus, the eNB may transmit the data using at least one of a first pattern at 812 and a second pattern at 814. The first pattern may include transmitting all of the plurality of TBs in order without repetition for a first time, e.g., such as at 806. FIG. 5 illustrates an example of such a first pattern at 506. The second pattern may include transmitting a first TB from the plurality of TBs, e.g., such as at 808 and transmitting a repeat of the first TB at 810 prior to transmitting a second TB from the plurality of TBs. FIG. 5 illustrates an example second pattern at 508 The first pattern may also comprise transmitting all of the plurality of TBs in order a second time, e.g., without intervening repetition of individual TBs, e.g., as illustrated in FIG. 5 for the data set and the first repeat of the data set in first pattern 506. The hybrid or combination pattern may include transmitting the data using both the first pattern at 812 and the second pattern at 814.

When multiple RBs are available for the transmission of the data, the eNB may transmit a first TB of the data and at least one repeat of the first TB of the data on a first RB at 816 and may transmit a second TB of the data and at least one repeat of the second TB of the data on a second RB at 818, such as described in connection with FIG. 6. The first RB and the second RB may occupy different subbands.

The first TB and the second TB may be transmitted in a diagonally shifted fashion, e.g., using aspects described in connection with FIG. 6.

Figure 9:
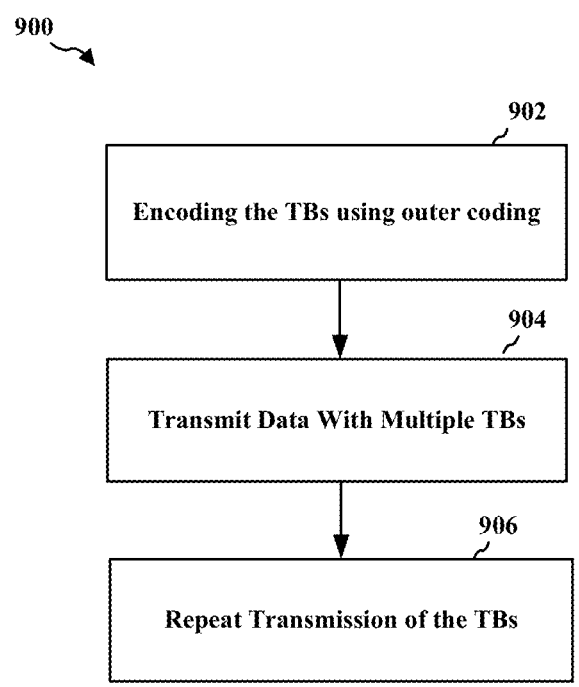
FIG. 9 is a flowchart of a method of wireless communication.

FIG. 9 is a flowchart 900 of a method of wireless communication. The method may be performed by an eNB (e.g., the eNB 102, 310, 1150, 1002/1002') in a NB communication system, e.g., 100 in FIG. 1. The NB communication system may comprise NB-IOT or eMTC, for example. At 902, the eNB may encode the TBs of data using error coding across multiple TBs of the data. At 904, the eNB transmits data comprising a plurality of TBs in a NB communications system. The NB communication system may comprise NB-IOT or eMTC, and the transmission of the data may be a broadcast or multicast transmission or unicast, such as described in connection with FIG. 8. The data transmission may be a large data transmission, and may be one for which each of the TBs must be received and decoded by the UE in order to function properly, such as a software upgrade. The encoding at 902 may enable further error correction at a UE, which addresses the challenge of failed TBs due to deep fading in NB communication.

At 906, the eNB repeats a transmission of the plurality of TBs. This repeated transmission may involve at least one repetition pattern, e.g. as described in connection with FIGS. 4-6. The repeating of the transmission at 906 may comprise any of the aspects of the repeating of the transmission at 804 in FIG. 8, e.g., any of 806, 808, 810, 812, 814, 816, and/or 818.

Figure 14:
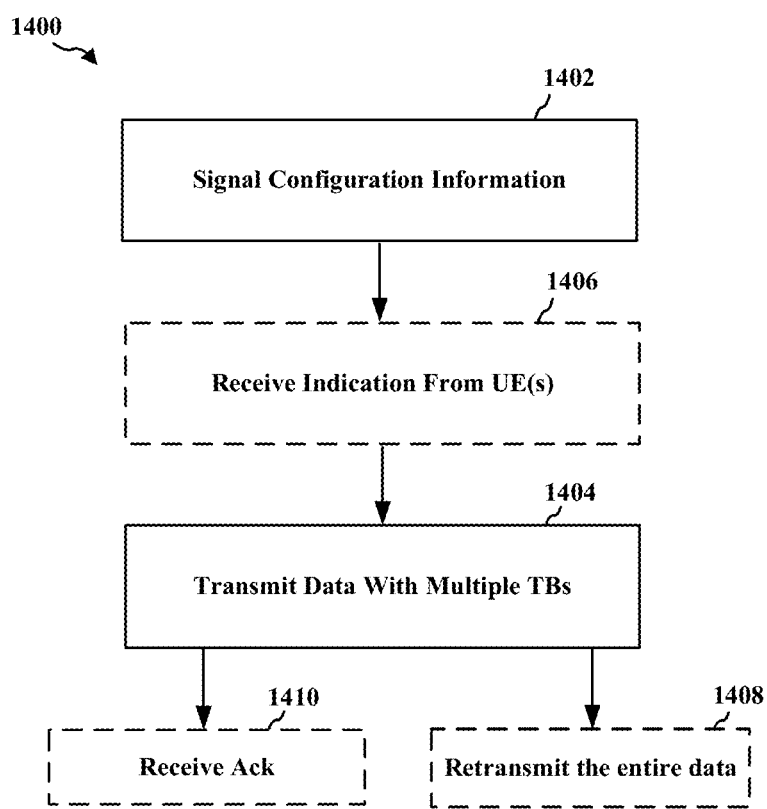
FIG. 14 is a flowchart of a method of wireless communication.

FIG. 14 is a flowchart 1400 of a method of wireless communication. The method may be performed by an eNB (e.g., the eNB 102, 310, 1150, 1002/1002').

At 1402, the eNB may signal configuration information indicating the transmission structure or arrangement and a time, frequency resource used for the plurality TBs.

The configuration information may be signaled using an SIB.

The configuration information may include a time for a broadcast transmission of the data. The configuration information may include a TB size for the data transmission. The configuration information may include a number of TBs comprised in the data transmission. The configuration information may include a repetition factor of each of the TBs of the data transmission. The configuration information may include a repetition factor of the data transmission. The configuration information may include a repetition pattern for the TBs of the data transmission. The configuration information may include a number of resource blocks used for the data transmission. The configuration information may include an indication of an intended UE coverage level for a corresponding pattern. The configuration information may comprise any at least one of these items of information, and may include a combination of these items of information.

At 1404, the eNB transmits data comprising a plurality of TBs in a NB communications system. The NB communication system may comprise NB-IOT or eMTC, and the transmission of the data may be a broadcast or multicast transmission or unicast, such as described in connection with FIG. 8. The data transmission may be a large data transmission, and may be one for which each of the TBs must be received and decoded by the UE in order to function properly, such as a software upgrade.

As a part of transmitting the data with multiple TBs at 1404, the eNB may repeat a transmission of the plurality of TBs. This repeated transmission may involve at least one repetition pattern, e.g. as described in connection with FIGS. 4-6. The repeating of the transmission at 906 may comprise any of the aspects of the repeating of the transmission at 804 in FIG. 8, e.g., any of 806, 808, 810, 812, 814, 816, and/or 818.

At 1406, the eNB may receive an indication from at least one UE and may determine that the at least one UE is ready to receive the transmission of the data prior to transmitting the data. The receipt of the indication from the UE at 1406 may trigger the eNB to begin transmitting the data at 1404.

At times the eNB may retransmit the entire data, e.g., at 1408. For example, the transmission of the data and the repeated transmission of the data form a data transmission pattern, such as one of the patterns described in connection with FIGS. 4-6, and as described in FIG. 8, e.g., in connection with 804. Following the transmission using the data transmission pattern, the eNB may transmit a repeat of the data a number of times. The retransmission of the entire data may a repeat of the data transmission pattern, or may involve a different data transmission pattern. The number of times for the retransmission of the entire data may be based on an estimation of failed TBs for a receiving UE.

At 1410, the eNB may receive an indication from at least one UE acknowledging that all of the TBs from the plurality of TBs were successfully received. This indication may be used by the eNB in determining whether to retransmit the data and/or what configuration to use in retransmitting the data. Therefore, if the eNB receives the ACK at 1410, the eNB may refrain from retransmitting the data. However, if the eNB does not receive an ACK from the UE, the eNB may retransmit the entire data at 1408.

The transmission of the data and the repeated transmission of the TBs in any of FIGS. 8, 9, and 14 may be comprised in the data from a single eNB. The transmission of the data and the repeated transmission of the TBs may be made using PDSCH The transmission of the data and the repeated transmission of the TBs comprised in the data in any of FIGS. 8, 9, and 14 may be multi-cast from multiple eNBs. For example, the transmission of the data and the repeated transmission of the TBs comprised in the data may be transmitted on a PMCH. The transmission of the data and the repeated transmission of the TBs may be made within an NB-MBSFN region of a NB-MBSFN subframe.

The transmissions may be performed in a frame that includes NCP on other frames and ECP for frames on which the plurality of TBs are transmitted. When a wideband system comprises ECP, the NB-MBSFN region may be a sub-band of the entire bandwidth in NB-MBSFN subframes, and when the wideband system comprises NCP, the NB-MBSFN region may occupy the entire bandwidth of the NB-MBSFN subframe.

Figure 15:
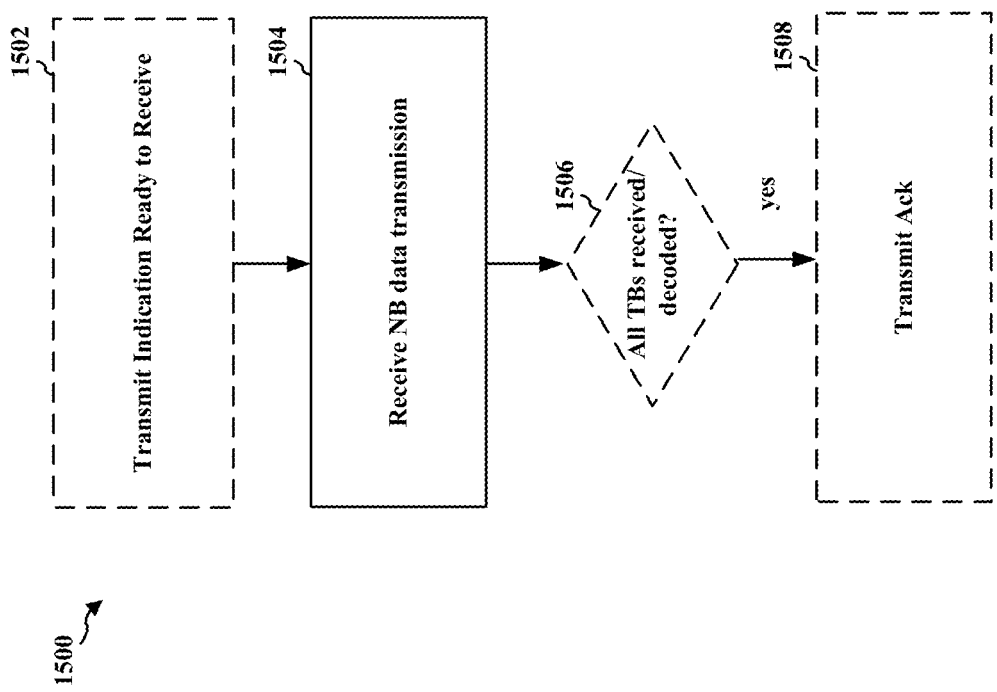
FIG. 15 is a flowchart of a method of wireless communication.

FIG. 15 is a flowchart 1500 of a method of wireless communication. The method may be performed by a UE (e.g., the UE 104, 350, 1050, the apparatus 1202/1202'). At 1502, the UE transmits an indication to an eNB using a NB that a UE is ready to receive a data transmission from the eNB, e.g., similar to the indication received by the eNB at 1406 in FIG. 14. At 1504, the UE receives an NB data transmission comprising a plurality of transport blocks from the eNB in response to the transmitted indication. This transmission may be in response to the indication sent at 1502. The NB data transmission received by the UE at FIG. 15 may include a repetition of the TBs, e.g., using patterns of repetition described in any of FIGS. 4-6. The NB data transmission may comprise TBs that are encoded using outer coding, e.g., as described in connection with FIG. 9. The UE may use such outer coding to perform error correction on the received NB data transmission.

The UE may also determine whether all of the plurality of TBs of the NB data transmission are successfully received and/or decoded by the UE at 1506. When the UE determines that all of the TBs of the NB data transmission have been successfully received and/or decoded, the UE may transmit an indication at 1508 to the eNB that all of the TBs were successfully received by the UE, e.g., an ACK. The ACK transmitted by the UE at 1508 may be similar to the ACK received by the eNB at 1410.

Figure 10:
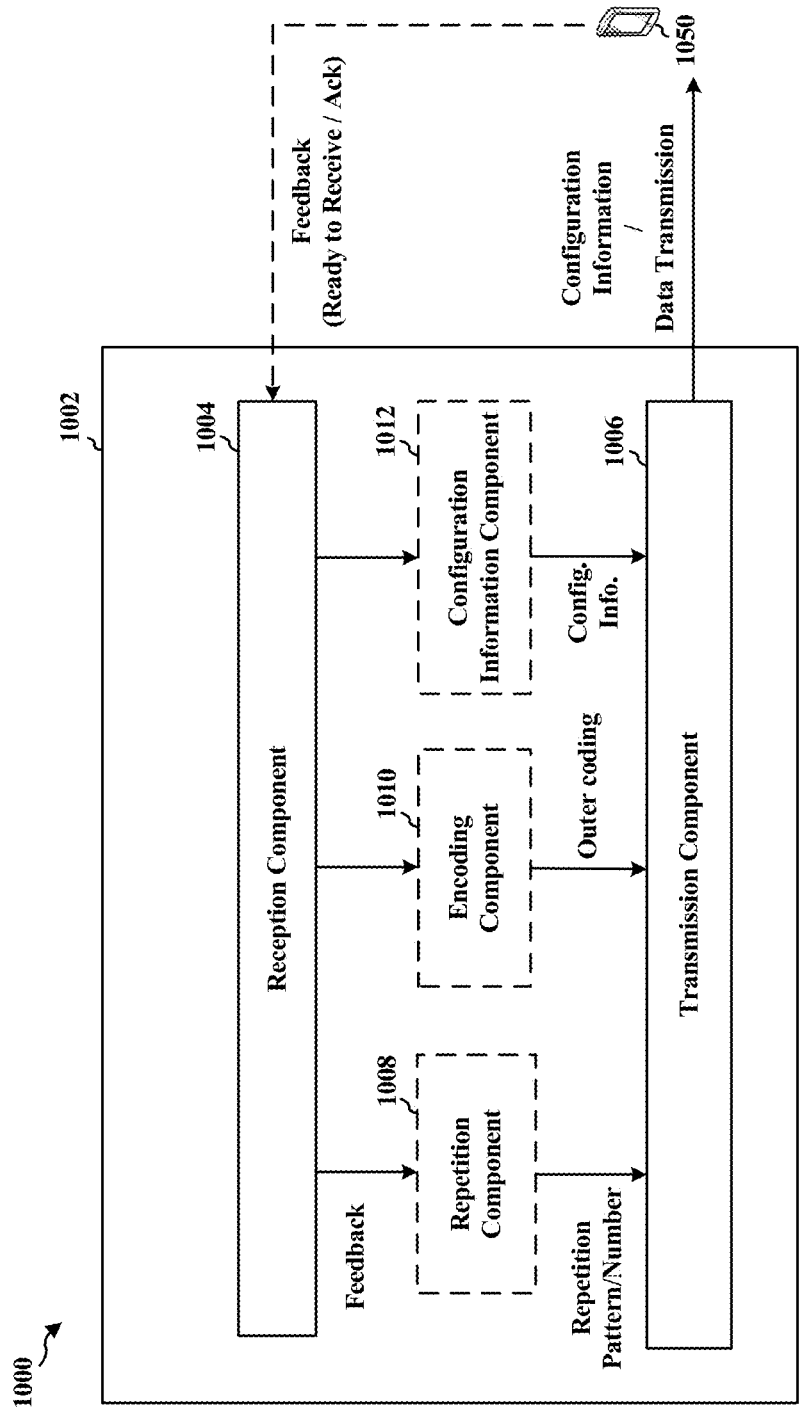
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be an eNB that transmits data to a UE 1050 using NB wireless communication, such as NB-IOT or eMTC. The apparatus includes a reception component 1004 that receives communication from the UE. This may include feedback from the UE, such as an indication that the UE is ready to receive the data transmission or an acknowledgement that the UE has successfully received all of the TBs of the data transmission. The apparatus includes a transmission component 1006 that transmits data comprising a plurality of transport blocks (TBs) in a narrow band communications system including repeating a transmission of the plurality of TBs. The data may be transmitted as a NB broadcast/multi-cast or as a unicast.

The apparatus may include a repetition component 1008 that determines a repetition pattern for TBs within the data transmission or for the data transmission itself. The repetition component may determine to use any of the patterns described in connection with FIGS. 4-6 and item 804-818 and 822 of FIG. 8 and 906 of FIG. 9.

The apparatus may include an encoding component 1010 that encodes the TBs of the data using error coding across multiple TBs of the data.

The apparatus may include a configuration Information Component 1012 that signals configuration information indicating the transmission structure (or arrangement) and a time, frequency resource used for the plurality TBs via the transmission component 1006.

The apparatus may include additional components that perform each of the blocks of the algorithm in the aforementioned flowcharts of FIGS. 8, 9, and 14. As such, each block in the aforementioned flowcharts of FIGS. 8, 9, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
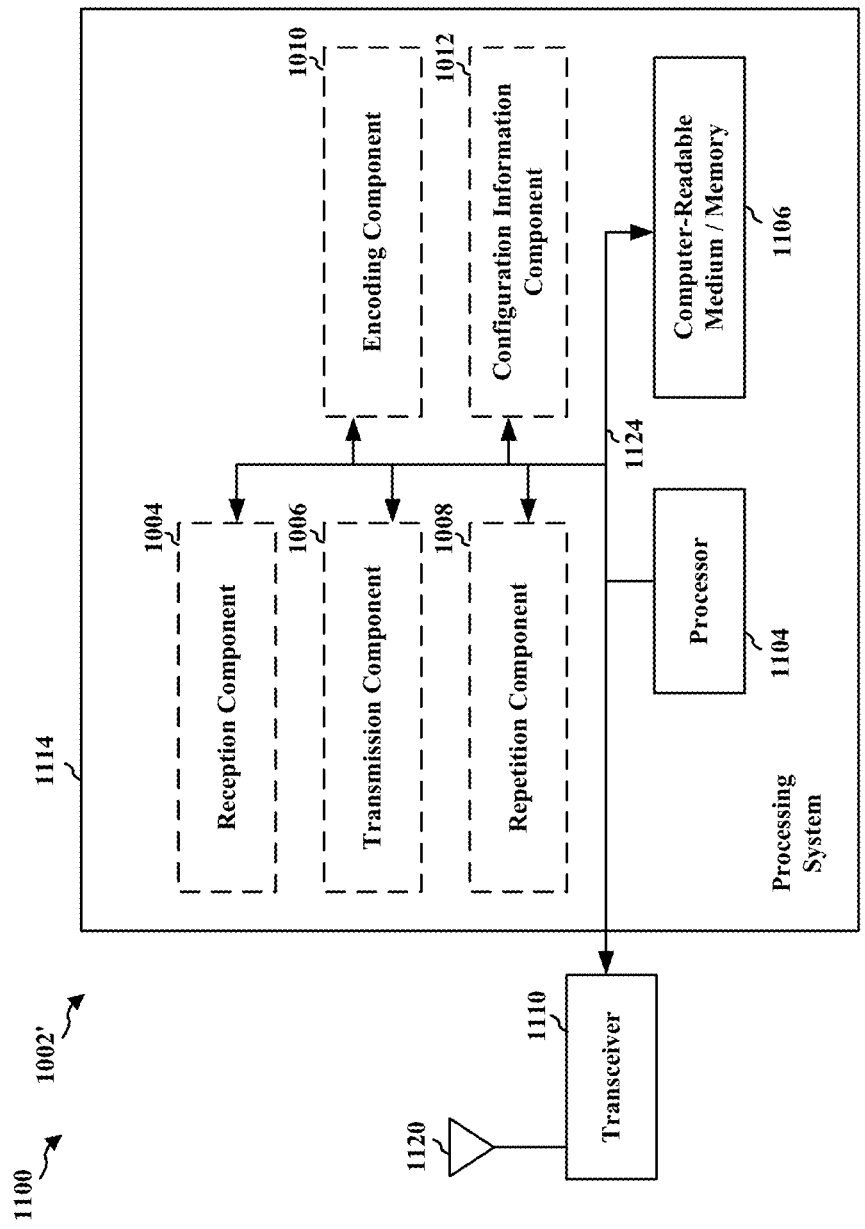
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1214, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication includes means for means for transmitting data comprising a plurality of transport blocks (TBs) in a narrow band communications system, including repeating a transmission of the plurality of TBs, means for encoding the TBs of the data using error coding across multiple TBs of the data, means for signaling configuration information indicating the transmission structure and a time, frequency resource used for the plurality TBs, means for receiving an indication from at least one UE and determining that the at least one UE is ready to receive the transmission of the data prior to transmitting the data, means for receiving an indication from at least one UE acknowledging that all of the TBs from the plurality of TBs were successfully received. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
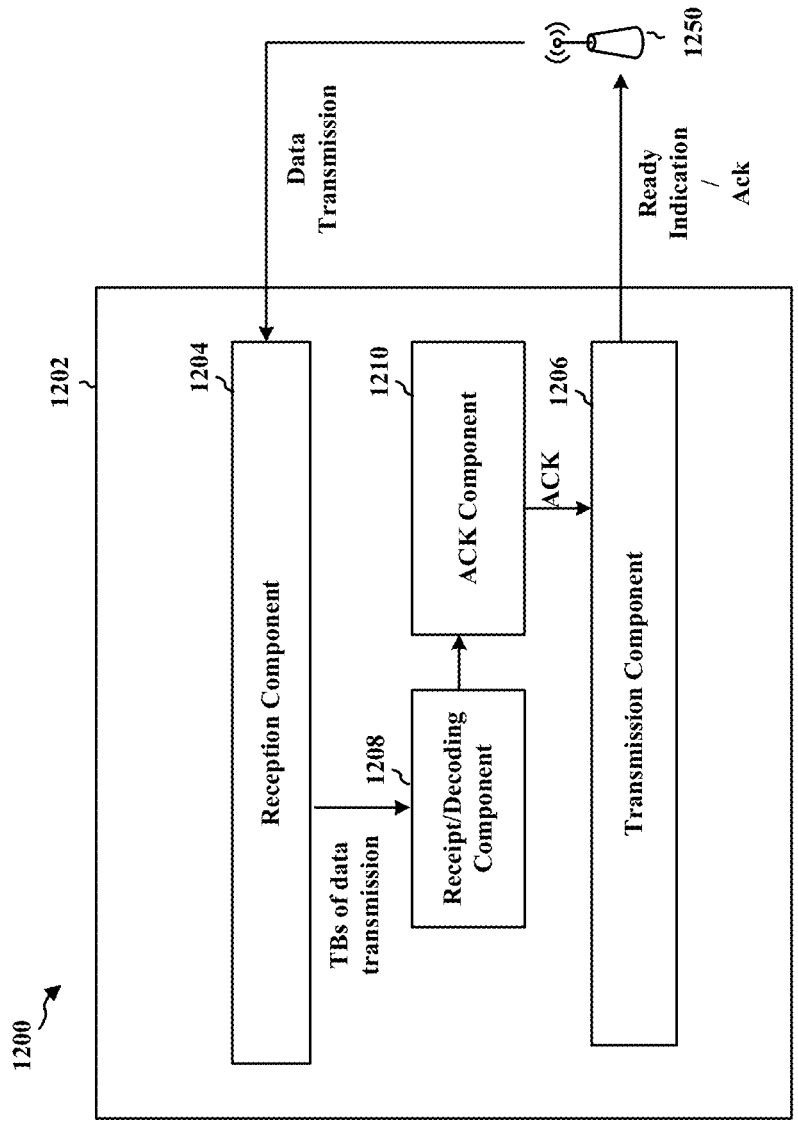
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE that communications with eNB 1250 using NB wireless communication. The apparatus includes a transmission component 1206 that transmits an indication to an eNB using the NB that a UE is ready to receive a data transmission from the eNB and a reception component 1204 that receives a NB data transmission comprising a plurality of transport blocks from the eNB in response to the transmitted indication. The apparatus 1202 may also include a receipt/decoding component 1208 that determines whether all of the plurality of TBs of the NB data transmission are successfully received by the UE and an ACK component 1210 that transmits an indication to the eNB that all of the TBs were successfully received by the UE via transmission component 1206.

The apparatus may include additional components that perform each of the blocks of the algorithm in the aforementioned flowcharts of FIG. 15. As such, each block in the aforementioned flowcharts of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
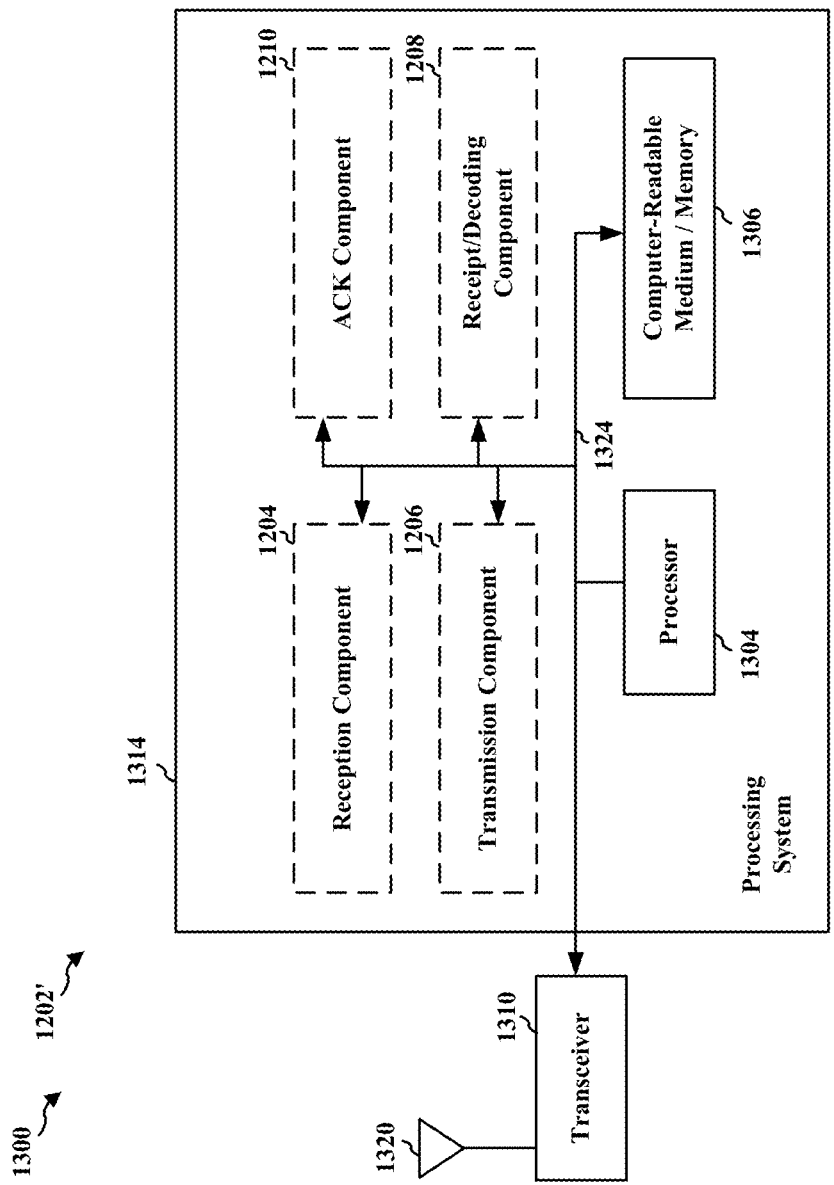
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for transmitting an indication to an eNB that a UE is ready to receive a data transmission from the eNB, means for receiving a NB data transmission comprising a plurality of transport blocks from the eNB in response to the transmitted indication, means for determining whether all of the plurality of TBs of the NB data transmission are successfully received by the UE, and means for transmitting an indication to the eNB that all of the TBs were successfully received by the UE. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving, from a base station, configuration information indicating a time and frequency resource and a transmission structure for a narrowband data transmission comprising a plurality of transport blocks;
    transmitting, in response to receipt of the configuration information, a ready indication to the base station using a narrow band, the ready indication indicating that the UE is ready to receive the narrowband data transmission from the base station; and
    receiving the narrowband data transmission from the base station after transmitting the ready indication.

2. The method of claim 1, further comprising:
    determining whether all of the plurality of transport blocks of the narrowband data transmission are successfully received by the UE; and
    transmitting an acknowledgment to the base station that all of the transport blocks were successfully received by the UE.

3. The method of claim 1, wherein the narrowband data transmission that is received in response to the transmitted ready indication comprises a repetition of the plurality of transport blocks.

4. The method of claim 1, wherein the plurality of transport blocks comprise transport blocks encoded using outer coding, the method further comprising:
    using the outer coding to perform error correction for the narrowband data transmission.

5. The method of claim 1, wherein the configuration information is received in system information from the base station.

6. The method of claim 1, wherein the configuration information includes at least one of:
    a time for a broadcast transmission of the narrowband data transmission;
    a transport block size for the narrowband data transmission;
    a number of transport blocks comprised in the narrowband data transmission;
    a first repetition factor of each of the transport blocks of the narrowband data transmission;
    a second repetition factor of the narrowband data transmission;
    a repetition pattern for the transport blocks of the narrowband data transmission indicating an order of repetition of the plurality of transport blocks within the data transmission;
    a number of resource blocks used for the narrowband data transmission; or
    an indication of an intended UE coverage level for a corresponding pattern.

7. The method of claim 1, wherein the narrowband data transmission is received on a physical downlink shared channel (PDSCH).

8. The method of claim 1, wherein the narrowband data transmission is received on a Physical Multi-Cast Channel (PMCH).

9. An apparatus for wireless communication at a user equipment (UE), comprising:
    a memory; and
    at least one processor coupled to the memory and configured to:
        receive, from a base station, configuration information indicating a time and frequency resource and a transmission structure for a narrowband data transmission comprising a plurality of transport blocks;
        transmit, in response to receipt of the configuration information, a ready indication to the base station using a narrow band, the ready indication indicating that the UE is ready to receive the narrowband data transmission from the base station; and receive the narrowband data transmission from the base station after transmitting the ready indication.

10. The apparatus of claim 9, wherein the at least one processor is further configured to:
determine whether all transport blocks of the plurality of transport blocks of the narrowband data transmission are successfully received by the UE; and
transmit an acknowledgment to the base station that all transport blocks of the plurality of transport blocks were successfully received by the UE.

11. The apparatus of claim 9, wherein the narrowband data transmission that is received in response to the transmitted ready indication comprises a repetition of the plurality of transport blocks.

12. The apparatus of claim 9, wherein the plurality of transport blocks comprise transport blocks encoded using outer coding, wherein the at least one processor is further configured to:
use the outer coding to perform error correction for the narrowband data transmission.

13. The apparatus of claim 9, wherein the configuration information includes at least one of:
a time for a broadcast transmission of the narrowband data transmission;
a transport block size for the narrowband data transmission;
a number of transport blocks comprised in the narrowband data transmission;
a first repetition factor of each of the transport blocks of the narrowband data transmission;
a second repetition factor of the narrowband data transmission;
a repetition pattern for the transport blocks of the narrowband data transmission indicating an order of repetition of the plurality of transport blocks within the data transmission;
a number of resource blocks used for the narrowband data transmission; or
an indication of an intended UE coverage level for a corresponding pattern.

14. The apparatus of claim 9, wherein the narrowband data transmission is received on a physical downlink shared channel (PDSCH).

15. The apparatus of claim 9, wherein the narrowband data transmission is received on a Physical Multi-Cast Channel (PMCH).

16. A method of wireless communication at a base station, comprising:
transmitting configuration information indicating a time and frequency resource and a transmission structure for a narrowband data transmission comprising a plurality of transport blocks;
receiving a ready indication from a user equipment (UE) using a narrow band, the ready indication indicating that the UE is ready to receive the narrowband data transmission from the base station; and
transmitting the narrowband data transmission in response to receiving the ready indication.

17. The method of claim 16, wherein the configuration information is broadcast in system information.

18. The method of claim 16, further comprising:
monitoring for an acknowledgment from the UE acknowledging that all transport blocks from the plurality of transport blocks were successfully received,
wherein the base station does not retransmit the plurality of transport blocks if the base station receive the acknowledgment, and
wherein the base station transmits the plurality of transport blocks if the base station does not receive the acknowledgment from the UE acknowledging that all transport blocks from the plurality of transport blocks were successfully received.

19. The method of claim 16, wherein the narrowband data transmission that is transmitted in response to the ready indication comprises a repetition of the plurality of transport blocks.

20. The method of claim 16, further comprising:
encoding the plurality of transport blocks using outer coding.

21. The method of claim 16, wherein the configuration information includes at least one of:
a time for a broadcast transmission of the narrowband data transmission;
a transport block size for the narrowband data transmission;
a number of transport blocks comprised in the narrowband data transmission;
a first repetition factor of each of the transport blocks of the narrowband data transmission;
a second repetition factor of the narrowband data transmission;
a repetition pattern for the transport blocks of the narrowband data transmission indicating an order of repetition of the plurality of transport blocks within the data transmission;
a number of resource blocks used for the narrowband data transmission; or
an indication of an intended UE coverage level for a corresponding pattern.

22. The method of claim 16, wherein the narrowband data transmission is transmitted on a physical downlink shared channel (PDSCH).

23. The method of claim 16, wherein the narrowband data transmission is transmitted on a Physical Multi-Cast Channel (PMCH).

24. An apparatus for wireless communication at a base station, comprising:
a memory; and
at least one processor coupled to the memory and configured to:
transmit configuration information indicating a time and frequency resource and a transmission structure for a narrowband data transmission comprising a plurality of transport blocks:
receive a ready indication from a user equipment (UE) using a narrow band, the ready indication indicating that the UE is ready to receive the narrowband data transmission from the base station; and
transmit the narrowband data transmission in response to the ready indication.

25. The apparatus of claim 24, wherein the at least one processor is further configured to:
monitor for an acknowledgment from the UE acknowledging that all transport blocks from the plurality of transport blocks were successfully received,
wherein the at least one processor is configured to not retransmit the plurality of transport blocks if the base station receive the acknowledgment and to transmit the plurality of transport blocks if the base station does not receive the acknowledgment from the UE acknowledging that all transport blocks from the plurality of transport blocks were successfully received.

26. The apparatus of claim 24, wherein the at least one processor is further configured to:

encode the plurality of transport blocks using outer coding.

\* \* \* \* \*